United States Patent Office 3,560,544
Patented Feb. 2, 1971

3,560,544
TRIORGANOSILOXY ENDBLOCKED POLY-OXYALKYLENE SILOXANE POLYMERS
Loren A. Haluska, Midland, Mich., assignor to
Dow Corning Corporation, Midland, Mich.
No Drawing. Filed Apr. 1, 1968, Ser. No. 717,929
Int. Cl. C07d *103/02;* C07f *7/02*
U.S. Cl. 260—448.2       9 Claims

ABSTRACT OF THE DISCLOSURE

The compositions are of the class of triorganosiloxy endblocked polyoxyalkylene siloxane polymers and salts thereof. It has been found that the compositions described herein are particularly useful as surfactants. Illustrative of the composition in question is a compound of the formula

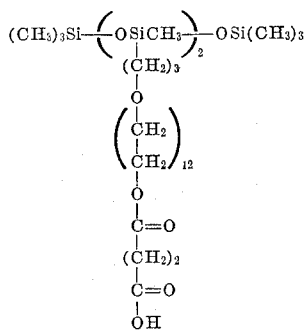

This invention relates to novel triorganosiloxy endblocked polyoxyalkylene siloxane polymers which have been found to be particularly effective as surfactants. For example, the compositions of the present invention can be added to certain aqueous systems whereby a desired decrease in surface tension can be achieved.

In addition to the above, the compositions described herein can be employed as wetting agents, detergents, emulsifying agents, fiber lubricants, and foam stabilizers for urethane foams.

This invention relates to triorganosiloxy endblocked polyoxyalkylene siloxane polymers of the general formula

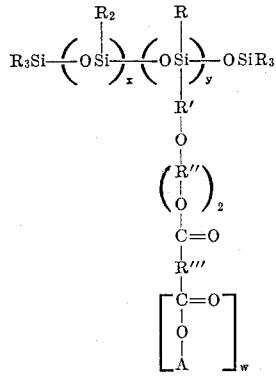

in which

R is selected from the group consisting of monovalent hydrocarbon and halogenated hydrocarbon radicals free of aliphatic unsaturation containing from 1 to 6 carbon atoms inclusive,
R' is a divalent hydrocarbon radical containing from 1 to 12 carbon atoms inclusive,
R" is a divalent hydrocarbon radical free of aliphatic unsaturation containing from 2 to 4 carbon atoms inclusive,
R''' is selected from the group consisting of a divalent and trivalent hydrocarbon radical containing from 2 to 6 carbon atoms inclusive,
A is selected from the group consisting of a hydrogen atom, an amine group and an alkali or alkaline earth metal,
$x$ has a value of from 0 to 100 inclusive,
$y$ has a value of from 1 to 100 inclusive,
$z$ has a value of from 1 to 50 inclusive, and
$w$ has a value of from 1 to 2 inclusive.

As noted in the formula defined above, R can be any monovalent hydrocarbon and halogenated hydrocarbon radical free of aliphatic unsaturation containing from 1 to 6 carbon atoms such as the methyl, ethyl, propyl, isopropyl, butyl, isobutyl, t-butyl, amyl, hexyl, phenyl, 3,3,3-trifluoropropyl, chloromethyl, bromopropyl, gamma-chloropropyl, and the iodophenyl radical. However, it is preferred that the R radical be methyl.

R' can be a divalent hydrocarbon radical containing from 1 to 12 carbon atoms such as the methylene, propylene, ethylene, butylene, isobutylene, hexylene, decylene, octadecylene, phenylene, methylphenylene, vinylene, and the allylene radical among numerous others. R' is preferably propylene.

R" can be a divalent hydrocarbon radical containing from 2 to 4 carbon atoms inclusive, i.e., the ethylene (preferred), propylene, and the butylene radical.

R''' can be a divalent or trivalent hydrocarbon radical containing from 2 to 6 carbon atoms such as the methylene, ethylene, propylene, hexylene, the $$-\overset{|}{C}HCH_2-, \quad -CH_2\overset{|}{C}H-CH_2-, \quad -CH_2\overset{|}{C}H-\overset{\overset{CH_3}{|}}{C}H-,$$

and the $$-CH_2CH_2CH_2CH_2\overset{|}{C}HCH_2-$$

radical. For purposes of this invention, ethylene is to be preferred.

A is selected from the group consisting of a hydrogen atom, an amine group such as NH₃,

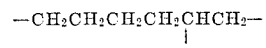

morpholine, (CH₃)₂NH, (CH₃CH₂)₃N,

and C₁₈H₃₇NH₂ or an alkali or alkaline earth metal such as sodium, lithium, potassium, cesium, magnesium, calcium, and strontium.

As noted above, $x$ has a value of from 0 to 100 inclusive, $y$ has a value of from 1 to 100 inclusive, $z$ has a value of from 1 to 50 inclusive, and $w$ has a value of from 2 to 6 inclusive. $x$ is preferably within the range from 0 to 25, $y$ is preferably within the range from 1 to 25 and $z$ is preferably within the range from 1 to 20.

The compositions of this invention are readily prepared by merely adding an organosilicon compound of the formula

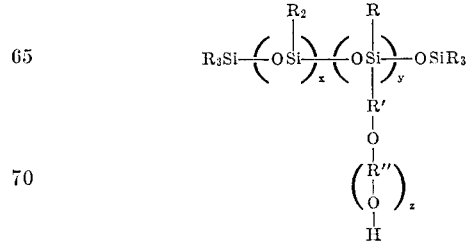

in which R, R', R", x, y, and z are as above defined to any cyclic anhydride of an aliphatic carboxylic acid, heating the admixture and ultimately recovering the desired triorganosiloxy endblocked polyxyalkylene siloxane polymer. To obtain the corresponding salt, one simply adds a stoichiometric amount of the amine or the appropriate alkoxide earth metal to the recovered triorganosiloxy endblocked polyoxyalkylene siloxane polymer at room temperature. The siloxane polymer and/or the amine or appropriate alkoxide are preferably diluted in a suitable organic solvent, i.e., alcohols such as methanol and the like.

Illustrative of the cyclic anhydrides which are used herein include succinic anhydride, dodecenyl succinic anhydride, glutaric anhydride, phthalic anhydride, maleic anhydride, and trimellitic anhydride among others.

To facilitate the reaction, the admixture is preferably heated at a moderate temperature, e.g., 80° C. or above. A temperature range of from about 80° C. to about 250° C. has been found to be quite satisfactory, Extremely high temperatures are to be avoided since deleterious side reactions may occur resulting in decreased yields of the triorganosiloxy endblocked polyoxyalkylene siloxane polymers.

The reaction can be conducted in the presence or absence of suitable catalysts. If desired, catalysts such as pyridine or sodium acetate can be included to further facilitate the reaction.

The following examples are illustrative only and should not be construed as limiting the invention which is properly delineated in the appended claims.

EXAMPLE 1

39.5 of succinic anhydride was added to 215.5 g. of

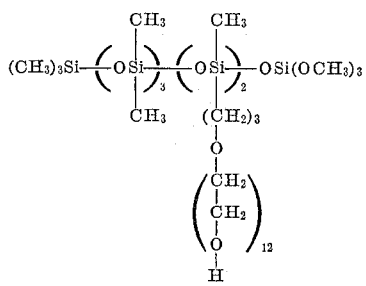

The admixture was heated for 3 hours at a temperature of from 110° C. to 135° C. in the presence of a catalyst (0.25 g.) of sodium acetate. A triorganosiloxy endblocked polyoxyalkylene siloxane polymer of the formula

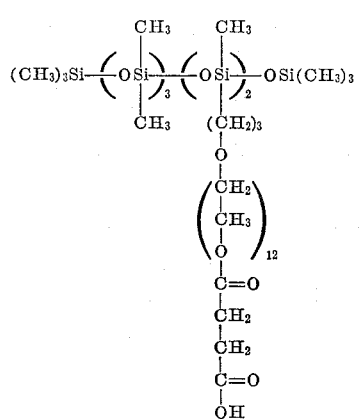

was obtained.

84.2 g. of the siloxane polymer was dissolved in 289.2 g. of methanol. 21.7 g. of a 25 percent solution of sodium methylate was added and the solution was stirred at room temperature. The methanol was stripped and the resulting product was the sodium carboxylic acid salt of the siloxane polymer.

EXAMPLE 2

352.2 g. of trimellitic anhydride was added to 1730.4 g. of

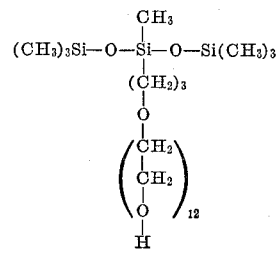

The admixture was heated at a temperature of 100° C. for 4 hours and a triorganosiloxy endblocked polyoxyalkylene siloxane polymer of the formula

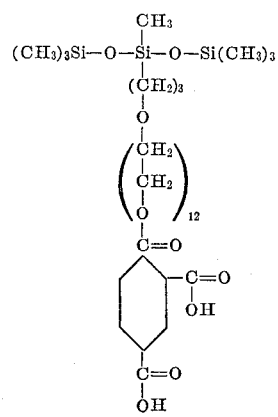

was obtained.

When the siloxane polymer was dissolved in methanol and a stoichiometric amount of $(CH_3CH_2)_3N$ was added, the resulting product was the corresponding amine carboxylic acid salt of the siloxane polymer.

EXAMPLE 3

33.3 g. of succinic anhydride was added to 272.4 g. of

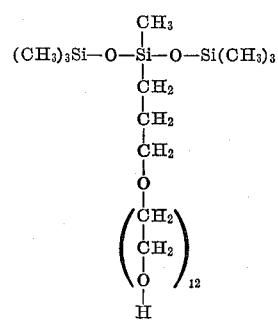

The admixture was heated at 95° C. for 4 hours and a triorganosiloxy endblocked polyoxyalkylene siloxane polymer of the formula

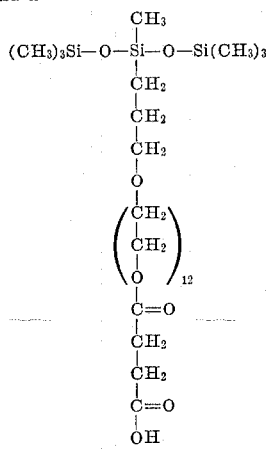

was obtained.

When the siloxane polymer was dissolved in methanol and a stoichiometric amount of

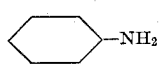

was added, the resulting product was the corresponding amine salt of the siloxane polymer.

EXAMPLE 4

When the following cyclic anhydrides and organosilicon compounds are mixed and reacted in accordance with the procedures set forth at Example 1, the triorganosiloxy endblocked polyoxyalkylene siloxane polymers noted below were obtained.

(A)

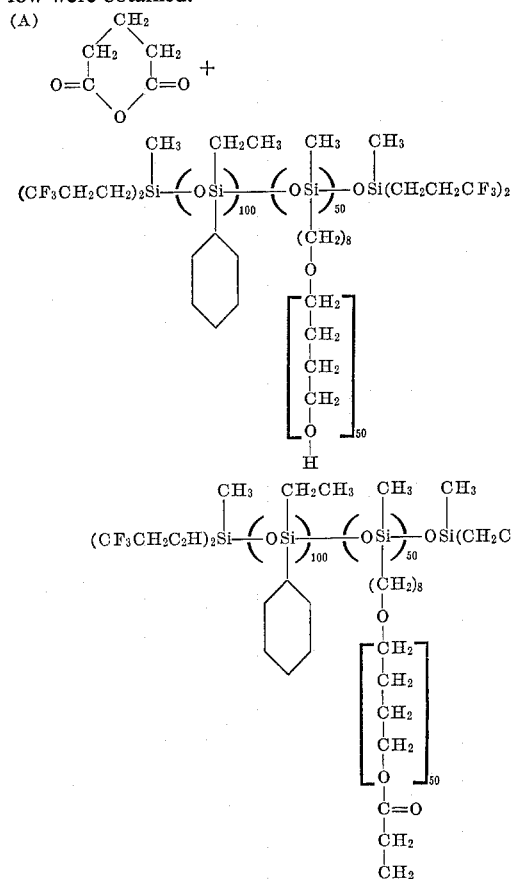

(B)

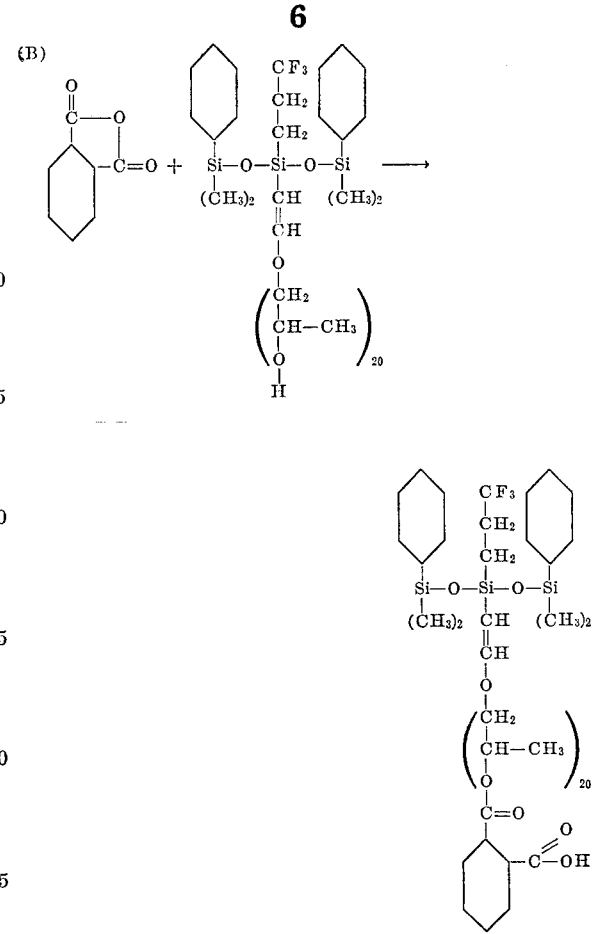

(C)

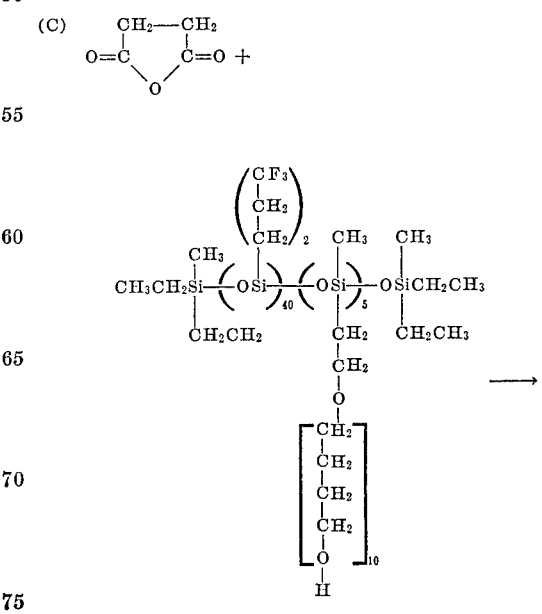

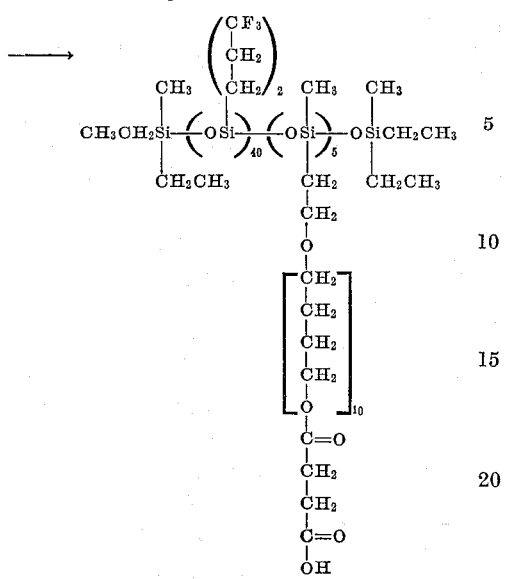

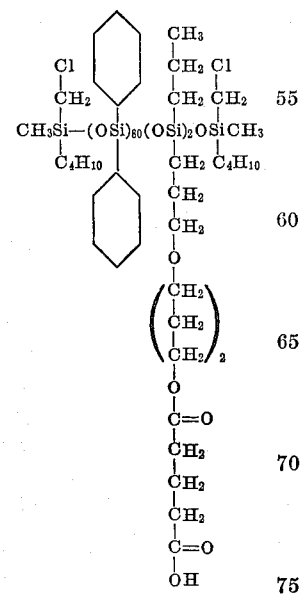

That which is claimed is:

1. A triorganosiloxy endblocked polyoxyalkylene siloxane polymer of the general formula

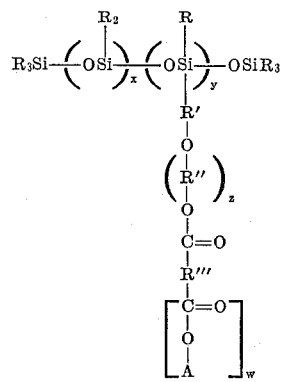

in which

R is selected from the group consisting of monovalent hydrocarbon and halogenated hydrocarbon radicals free of aliphatic unsaturation containing from 1 to 6 carbon atoms inclusive, R' is a divalent hydrocarbon radical containing from 1 to 12 carbon atoms inclusive, R'' is a divalent hydrocarbon radical free of aliphatic unsaturation containing from 2 to 4 carbon atoms inclusive, R''' is selected from the group consisting of a divalent and trivalent hydrocarbon radical containing from 2 to 6 carbon atoms inclusive, A is selected from the group consisting of a hydrogen atom, triethylamine, aniline, and an alkali or alkaline earth metal, $x$ has a value of from 0 to 100 inclusive, $y$ has a value of from 1 to 100 inclusive, $z$ has a value of from 1 to 50 inclusive, and $w$ has a value of from 1 to 2 inclusive.

2. A triorganosiloxy endblocked polyoxyalkylene siloxane polymer as recited in claim 1 in which R is a methyl radical.

3. A triorganosiloxy endblocked polyoxyalkylene siloxane polymer as recited in claim 2 in which R' is a propylene radical, R'' is an ethylene radical, R''' is an ethylene radical, the value of $x$ is within the range of from 0 to 25, the value of $y$ is within the range of from 1 to 25, the value of $z$ is within the range of from 1 to 20, and $w$ is within the range of from 1 to 2.

4. A triorganosiloxy endblocked polyoxyalkylene siloxane polymer as recited in claim 1 in which the formula is 5. A triorganosiloxy endblocked polyoxyalkylene siloxane polymer as recited in claim 1 in which the formula is

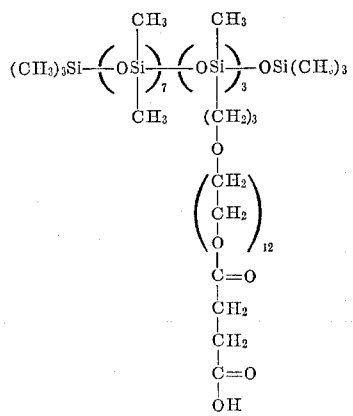

6. The triorganosiloxy endblocked polyoxyalkylene siloxane polymer as recited in claim 1 in which the formula is

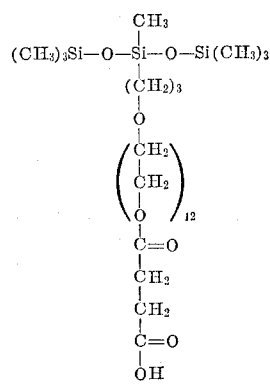

7. The triorganosiloxy endblocked polyoxyalkylene siloxane polymer as recited in claim 1 in which the formula is

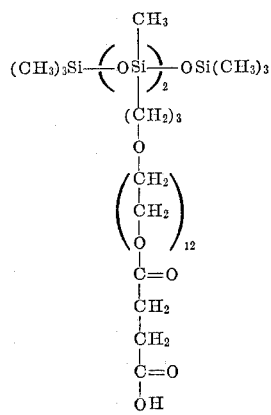

8. The triorganosiloxy endblocked polyoxyalkylene siloxane polymer as recited in claim 1 in which the formula is

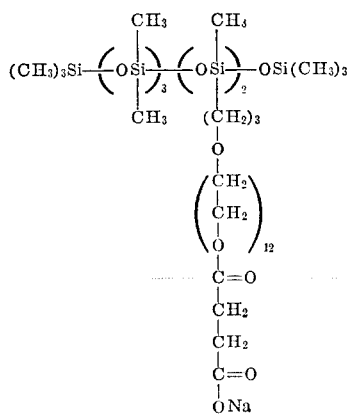

9. A triorganosiloxy endblocked polyoxyalkylene siloxane polymer as recited in claim 1 in which the formula is

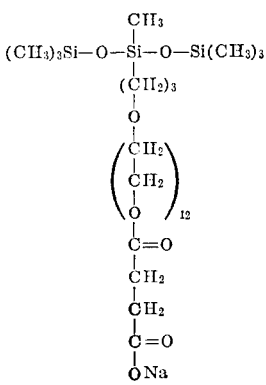

References Cited
UNITED STATES PATENTS

| | | | |
|---|---|---|---|
| 3,168,543 | 2/1965 | Black et al | 260—448.2(B) |
| 3,271,331 | 9/1966 | Ender | 260—448.2X |
| 3,402,192 | 9/1968 | Haluska | 260—448.2(B) |
| 3,427,271 | 2/1969 | McKellar | 260—448.2X |

TOBIAS E. LEVOW, Primary Examiner

P. F. SHAVER, Assistant Examiner

U.S. Cl. X.R.

252—89, 356; 260—2.5, 824, 448.2B